United States Patent [19]

Mercat

[11] Patent Number: 5,018,392

[45] Date of Patent: May 28, 1991

[54] METHOD AND SYSTEM FOR ZERO-RESETTING OF A TORQUE-MEASURING DEVICE, ESPECIALLY ON A CYCLE OR LIKE VEHICLE

[75] Inventor: Jean-Pierre Mercat, Chateau Renault, France

[73] Assignee: STE Look, Nevers, France

[21] Appl. No.: 494,320

[22] Filed: Mar. 16, 1990

[30] Foreign Application Priority Data

Mar. 29, 1989 [FR] France ................................ 89 04058

[51] Int. Cl.$^5$ .......................... G01L 3/02; B67D 5/26; A63B 49/00
[52] U.S. Cl. ................................... 73/862.19; 273/73; 222/33; 222/32; 222/35
[58] Field of Search ................ 73/379, 862.19, 862.34; 222/33, 32, 35; 280/734, 135; 272/73, DIG. 5, DIG. 6; 362/193; 224/130; 364/571.01

[56] References Cited

FOREIGN PATENT DOCUMENTS 0270439 11/1986 European Pat. Off. .
0283705 9/1988 European Pat. Off. .
2606876 5/1988 France .
2617970 1/1989 France .
63-262535 10/1988 Japan .

Primary Examiner—Joseph A. Orsino
Assistant Examiner—Franklin V. Nguyen
Attorney, Agent, or Firm—Young & Thompson

[57] ABSTRACT

A method for zero-resetting of a device for measuring transmitted torque while a cycle is in motion consists in monitoring a phenomenon or a parameter which is normally variable during normal use of the cycle and which disappears or becomes constant when the driving wheel rotates on free-wheel motion. When the disappearance or the constant character of the phenomenon or parameter thus monitored is observed during a predetermined period of time, one initiates zero-resetting of the detector system or of the measuring system proper of the torque-measuring device. The device for carrying out the method includes on the one hand a monitor for the phenomenon or parameter and on the other hand a control which are operated in dependence on the signal emitted by the monitor and which are then capable of producing action on the detection system or the measuring system in order to reset either of these two systems to zero.

6 Claims, 2 Drawing Sheets

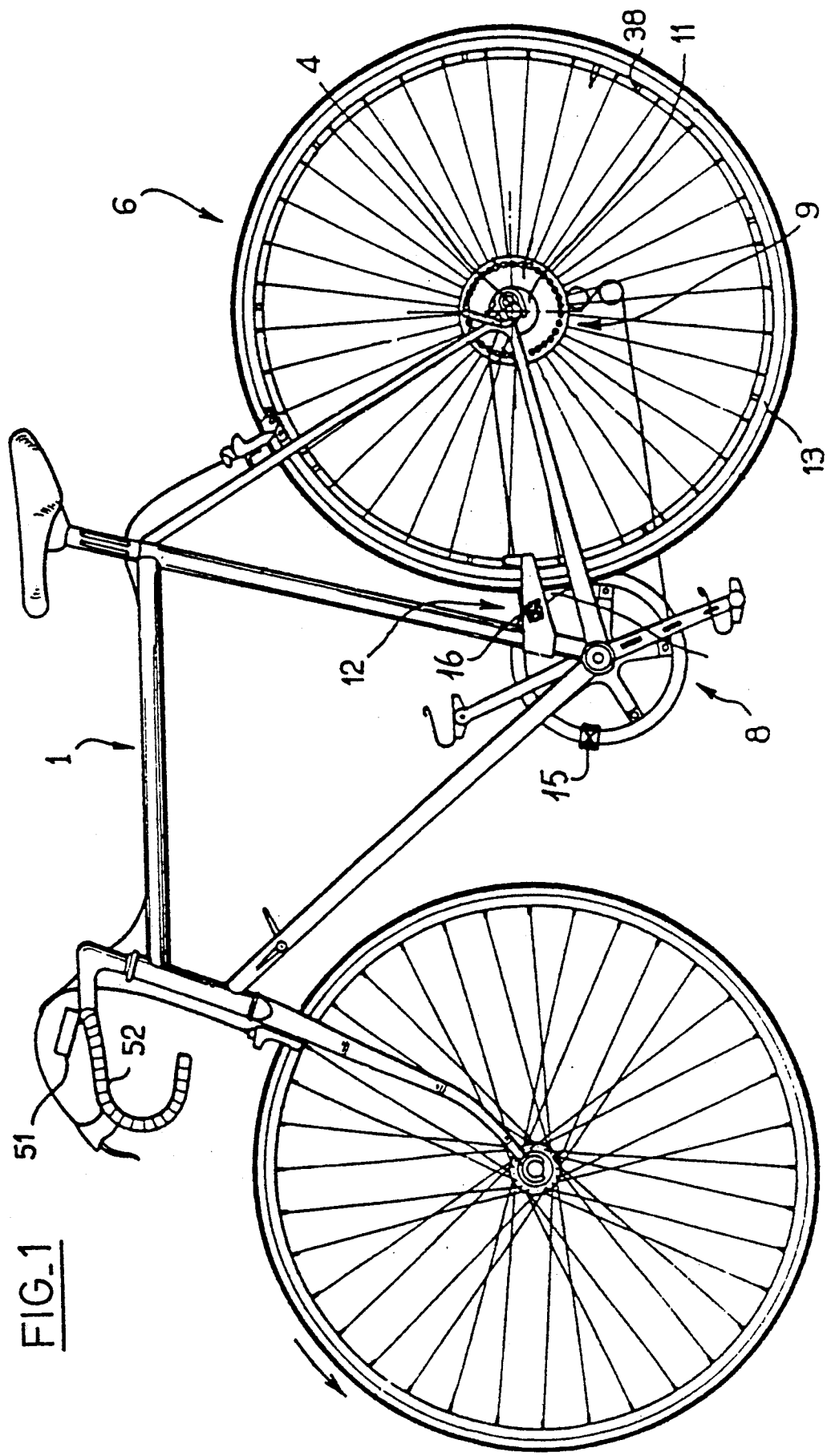
FIG_1

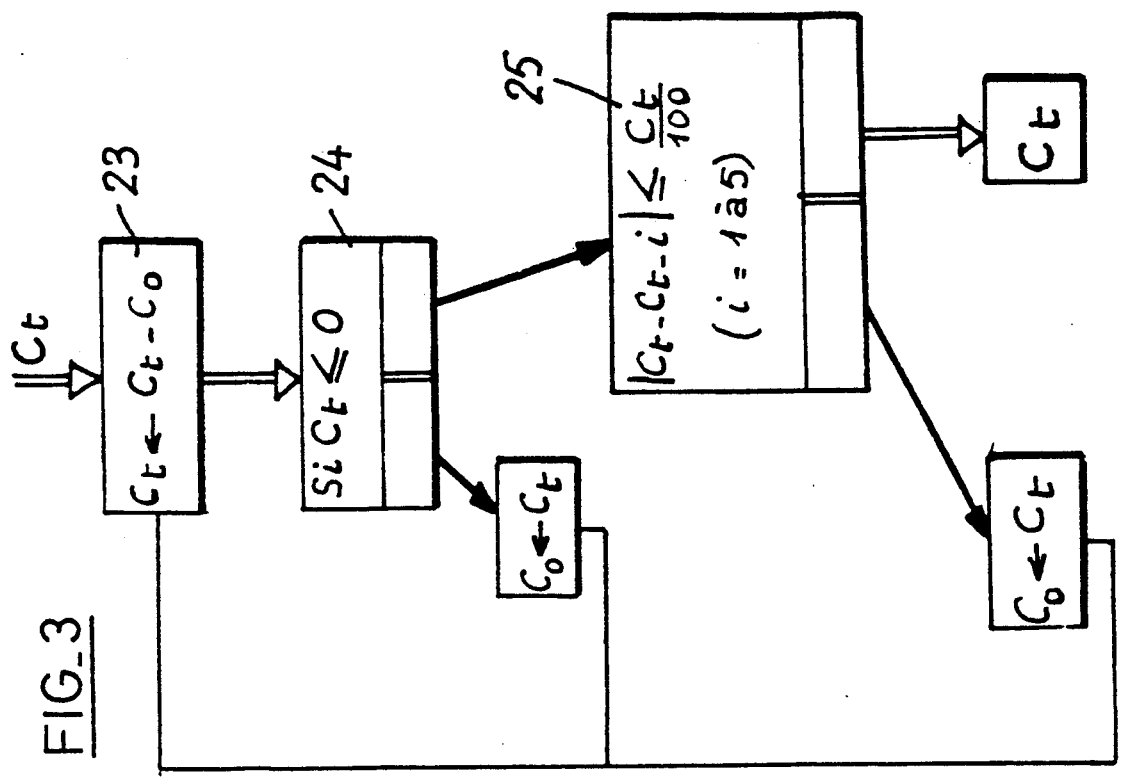
FIG_3
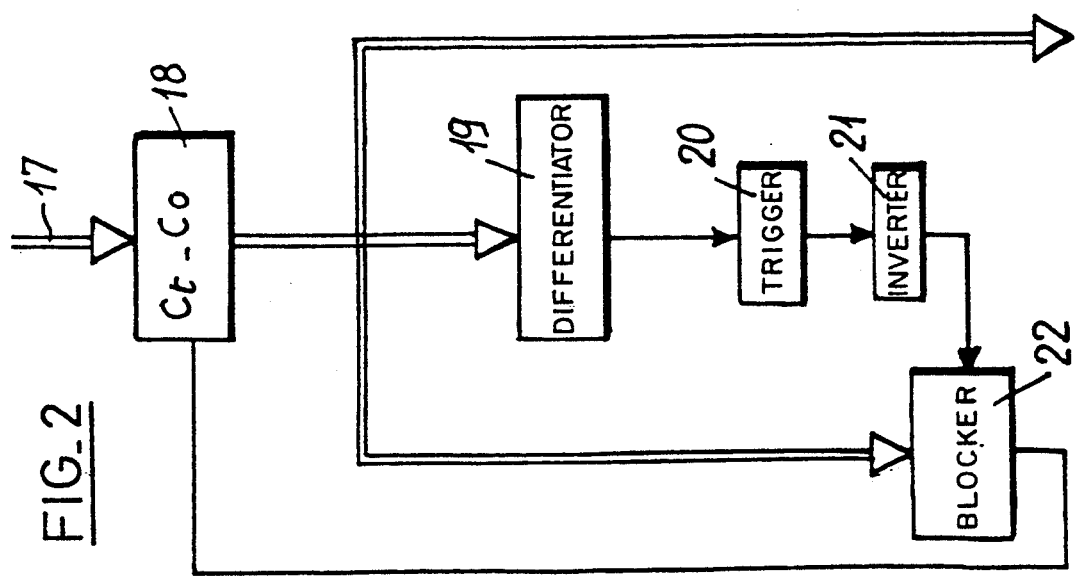
FIG_2

METHOD AND SYSTEM FOR ZERO-RESETTING OF A TORQUE-MEASURING DEVICE, ESPECIALLY ON A CYCLE OR LIKE VEHICLE

BACKGROUND OF THE INVENTION

1. Field of the Invention

The present invention relates to the methods and devices employed for measuring the driving torque or an associated quantity, especially on a cycle or like vehicle.

2. Description of the Prior Art

In all the systems which exist at the present time such as those described in French patents No. 2,606,876 and No. 2,617,970, for example, the value of the torque to be measured is determined by measurement of a force, of a displacement or of a deformation. The sensitivity of these systems is wholly reproducible but the zero point which corresponds to the measurement information in respect of a zero torque on the driving wheel is subject to variations. These variations may be due for example to a variation in temperature, to creep deformation of material, to permanent deformation, to mechanical friction or to any other disturbing physical phenomenon.

In some measuring instruments in which a similar problem exists, provision is made for a system which enables the user to carry out a zero reset prior to each fresh measurement. This is the case in particular in weighing balances. In these instruments, a certain number of parameters are in fact liable to vary in time and a large number of events (overload or creep, for example) are liable to disturb the measurements. In order to obviate this problem, it is only necessary to provide a system for resetting to zero prior to any fresh measurement since the disturbing phenomena will not subsequently have time to vary during a measurement.

A similar solution could be contemplated only in certain torque-measuring devices which equip cycles in order to permit zero-resetting when the cycle is stationary, namely in devices which make use of measuring gages. On the other hand, a solution of this type would not be suitable in the case of devices which perform a dynamic measurement, for example devices of the type described in French patent No. 2,606,876 since these latter are incapable of providing information on the torque when the driving wheel is not rotating.

Moreover, taking account of the fact that bicycle training sessions are often of very long duration and take place under variable climatic conditions, there is a possibility that the zero point of the measuring device may shift during one and the same utilization of a cycle. In order to solve the problem presented, it is therefore not sufficient to provide a possibility of zero-resetting at a standstill prior to use of a cycle.

It is for the foregoing reasons that the present invention is directed to a method which is specially conceived to ensure that the torque-measuring device fitted on a cycle can be reset to zero during actual use of the cycle provided that this latter has a driving wheel fitted with a free-wheel mechanism.

SUMMARY OF THE INVENTION

The method in accordance with the invention is distinguished by the fact that:

a monitoring operation is applied to a phenomenon or a parameter which is normally variable during normal use of the cycle and which disappears or becomes constant when the driving wheel rotates in free-wheel motion, when the disappearance or the constant character of the phenomenon or of the parameter thus monitored is observed during a predetermined period of time, one initiates zero-resetting of the detector system or of the measuring system proper of the torque-measuring device.

This method therefore makes profitable use of the fact that, on a cycle having a driving wheel equipped with a free-wheel mechanism, the user can stop pedaling when he has gathered speed. In fact, when the cycle is in free-wheel motion, the torque transmitted to the driving wheel is obviously zero. It is for this reason that the method in accordance with the invention is intended to determine the moment at which the cycle is in free-wheel motion in order to permit zero-resetting of the torque-measuring device at that moment. However, determination of the moments of free-wheel operation can be achieved in accordance with this method by observing either the disappearance of a phenomenon related to normal use of the cycle (rotation of the pedal crank gear, for example) or the constant character of a parameter which is normally variable during normal use such as, for example, the curve of variation of the measured torque. It should be noted in this respect that the torque transmitted by a cyclist is a value which is variable in time by reason of the very fact that the pedaling movement of a cyclist is an alternating movement. In consequence, when the cyclist is pedaling, there is no single moment at which the torque can remain constant apart from the moments at which it is zero, that is to say the moments at which the cycle is in free-wheel motion.

It is for this reason that, in a first embodiment of this method, the monitoring operation is applied to the movement of rotation of the pedal crank gear of the cycle and, in the event of disappearance of this movement during a given time interval, zero-resetting of the torque-measuring device is initiated.

In another embodiment of the method in accordance with the invention, the monitoring operation is applied to the curve of variation of the value measured by the torque-measuring device and, in the event of a constant character of said curve during a given time interval, zero-resetting of said measuring device is initiated.

However, the invention is also concerned with a system which is capable of carrying out automatic zero-resetting of a torque-measuring device fitted on a cycle, by carrying out the method defined in the foregoing. To this end, said system comprises in combination:

on the one hand means for monitoring a phenomenon or a parameter which disappears or becomes constant when the driving wheel rotates in free-wheel motion, these detection means being capable of emitting a predetermined signal when this event takes place during a given time interval, on the other hand control means which operate in dependence on the signal emitted by said monitoring means and are then capable of producing action on the detection system or on the measuring system proper of the torque-measuring device in order to initiate zero-resetting of either of these two systems.

BRIEF DESCRIPTION OF THE DRAWINGS

FIG. 1 is a view in side elevation of a bicycle equipped with a torque-measuring device comprising a zero-resetting system in accordance with the invention.

FIGS. 2 and 3 are two block diagrams corresponding to two other forms of construction of said zero-resetting system.

DESCRIPTION OF THE PREFERRED EMBODIMENTS

The bicycle 1 shown by way of example in FIG. 1 is equipped with a torque-measuring device of the type described in French patent No. 2,606,876. This device therefore comprises in combination on the one hand means 9 for detecting the angular position of the hub 11 of the driving wheel 6 about its spindle 4 and, on the other hand, means 12 for detecting the angular position of the rim 13 of the same wheel about its axis. However, this measuring device need not be described in greater detail since this description is given in French patent No. 2,606,876. As indicated in this patent, this device serves to display the result of the measurement on an electronic casing 51 attached to the handlebar 52 of the cycle.

However, in the case considered here, the measuring device is equipped with a zero-resetting system in accordance with the invention. In the example shown in FIG. 1, this system comprises monitoring means which are capable of detecting absence of rotation of the pedal crank gear 8 of the cycle. These monitoring means can consist of the combination of a permanent magnet 15 mounted against the inner face of a ring of the crank gear 8 and of a magnetic-effect motion sensor 16. Said sensor can be integrated within the casing which contains the detection means 12 for monitoring the deformation of the wheel rim 13.

Moreover, the electronic measuring device contained in the casing 51 comprises a zero-resetting system. This latter is in fact operated in dependence on the sensor 16 and more precisely on a signal emitted by said sensor. To this end, the sensor is so arranged as to be capable of emitting a predetermined signal in the direction of the measuring device when it no longer detects any passing movement of the permanent magnet 15 and when it "observes" that the pedal crank gear is no longer rotating, which corresponds to free-wheel operation of the cycle. The signal thus emitted then produces action on the system for zero-resetting of the measuring device so as to restore this latter to zero.

Thus if the user desires to carry out zero-resetting of the measuring device while riding the cycle, it is only necessary to free-wheel.

Moreover, this zero-resetting operation takes place automatically as soon as the cyclist stops pedaling for any reason (when riding downhill, for example).

However, the system considered is so designed as to produce a zero-reset only if the sensor 16 delivers no information relating to rotation of the pedal crank gear during a given time interval (two seconds, for example), which is essential in order to be certain that the cycle is operating in free-wheel motion.

Other forms of construction of the zero-resetting system in accordance with the invention are designed to produce automatic action when an operating parameter related to normal use of the cycle such as the curve of variation of the value of torque becomes constant during a given time interval. In fact, this also results from free-wheel operation of the cycle and therefore from absence of torque transmission which permits zero-resetting. Systems designed on this principle have the advantage of a faster action than the system described earlier. In addition, they are capable of operating even if the cyclist continues to pedal at low speed while free-wheeling.

The systems employed may assume different forms according to the signals emitted by the detecting means 9 and 12 of the torque-measuring device are processed in digital or analog form.

FIG. 2 is a block diagram of a zero-resetting system designed for the second case or in other words for analog processing. Materialization of the real torque is obtained in this case by means of a continuous signal in the form of a voltage or a current Ct which is defined at each instant. This current is directed by a conductor 17 to an operational amplifier 18 which operates as a subtracter for deducting the origin shift from the input signal. The signal obtained is delivered to a differentiator 19 followed by a trigger 20 and an inverter 21. Moreover, the circuit comprises a blocker 22 which is also connected to the subtracter 18. The arrangement of this system is such that, in the event of insufficient variation of the received signal, the trigger 20 is no longer actuated. This accordingly produces zero-resetting of the measuring device. However, by means of the blocker 22, the determined constant value is retained in memory until the next moment of free-wheel operation of the cycle.

FIG. 3 is a block diagram of a zero-resetting system which is designed to be employed at the time of digital processing of the measurements derived from the detectors 9 and 12. In such a case, the microprocessor which equips the measuring device therefore makes use of successive numerical values which are representative of the value of torque. Said microprocessor thus no longer processes a continuous function as in the previous case but successive values constituting a sample. The frequency of this latter does not need to be very high in view of the slowness of the pedaling rate. Thus it is only necessary to have twenty numerical measurements per second in order to permit accurate restitution of the real curve of variation of the transmitted torque.

The zero-resetting system employed in such a case can be designed to compare five successive values of the instantaneous torque Ct and to check whether they are close to each other at intervals of 1%. Should this be the case, said system accordingly initiates zero-resetting of the measuring device.

In a first stage 23 of said system, a value Co corresponding to the origin shift is subtracted from the input value Ct. In the following stage 24, there is carried out a comparison with the zero value. Another stage 25 of the present system makes a comparison of the five successive values of Ct and, in the event that they are practically identical, this stage then initiates zero-resetting of the measuring device.

In regard to the stage 24 mentioned above, this stage is provided by reason of the fact that the variations with respect to zero can be indifferently positive or negative. Now in accordance with the free-wheel principle, the transmitted torque can only be positive. If the system detects a negative value for the torque, it is because the zero is displaced by at least this negative value. For this reason, the stage 24 is provided for carrying out a check with the zero value in order to make a suitable correction if necessary.

However, the systems described in the foregoing constitute only possible examples of construction of the present system for zero-resetting of the torque-measuring device. In fact, many other forms of construction of this system could be contemplated.

Furthermore, said zero-resetting system can equip torque-measuring devices of a type which differs from that described in French patent No. 2,606,876 since this latter has been cited earlier solely by way of example.

What is claimed is:

1. A method for zero-resetting of a device for measuring transmitted torque during use of a cycle equipped with said device and having a driving wheel fitted with a free-wheel mechanism, wherein:
    a monitoring operation is applied to a phenomenon or a parameter which is normally variable during normal use of the cycle and which disappears or becomes constant when the driving wheel rotates in free-wheel motion, and
    when the disappearance or the constant character of the phenomenon or of the parameter thus monitored is observed during a predetermined period of time, initiating zero-resetting of the torque-measuring device.

2. A method according to claim 1, wherein the monitoring operation is applied to the movement of rotation of the pedal crank gear of the corresponding cycle and wherein, in the event of disappearance of said movement during a given time interval, zero-resetting of the torque-measuring device is initiated.

3. A method according to claim 1, wherein the monitoring operation is applied to the curve of variation of the value measured by the torque-measuring device and wherein, in the event of a constant character of said curve during a given time interval, zero-resetting of said measuring device is initiated.

4. A system for automatic zero-resetting of a device for measuring transmitted torque which is fitted on a cycle having a driving wheel provided with a free-wheel mechanism, wherein said system comprises in combination:
    means for monitoring a phenomenon or a parameter which disappears or becomes constant when the driving wheel rotates in free-wheel motion, these monitoring means being capable of emitting a predetermined signal when this event takes place during a given time interval, and
    control means which operate in dependence on the signal emitted by said monitoring means and are then capable of producing action on the torque-measuring device in order to initiate zero-resetting of the torque-measuring device.

5. A system for automatic zero-resetting according to claim 4, wherein the monitoring means provided in said system consist of a motion sensor which is placed opposite to a pedal crank gear of the cycle in order to monitor a movement of rotation of said pedal crank gear and which is capable of emitting a given signal in the direction of the means for initiating the zero-resetting operation when said sensor no longer detects said movement of the pedal crank gear.

6. A system for automatic zero-resetting according to claim 4, wherein the monitoring means provided in said system consist of means for monitoring variations of the value measured by the torque-measuring device, said monitoring means being capable of emitting a given signal in the direction of the means for initiating the zero-resetting operation when said monitoring means detect that the measured value remains constant during a given time interval.

* * * * *